June 10, 1969  S. LYNN ET AL  3,449,650
CAPACITOR ANODE HOLDER
Filed Dec. 29, 1967
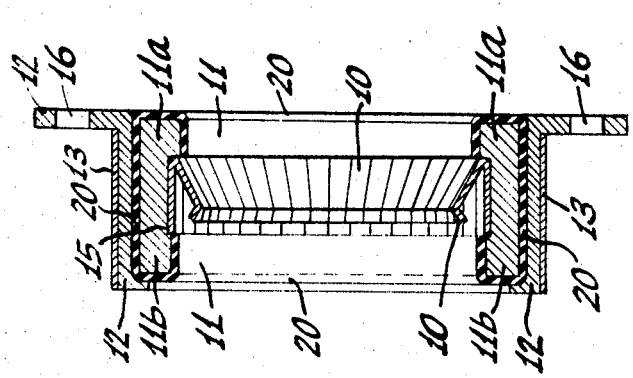
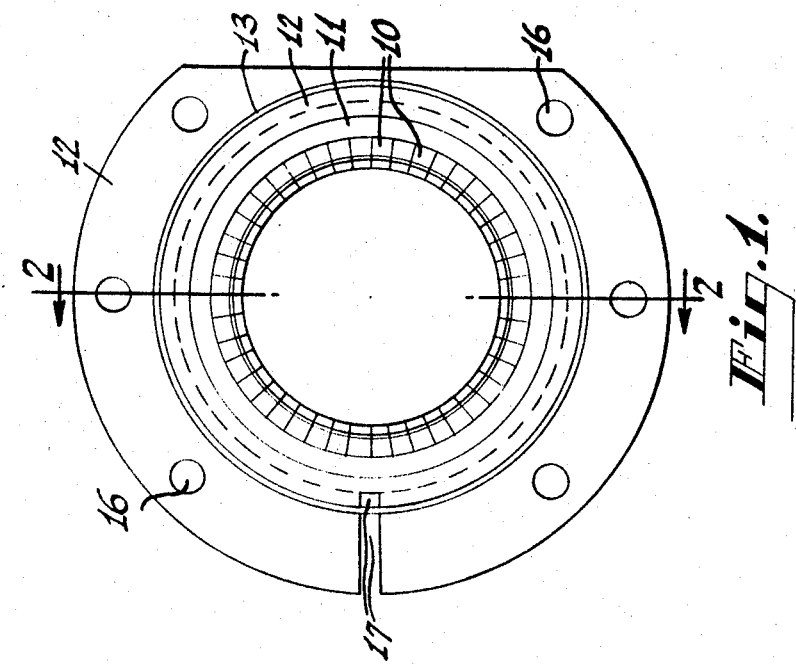
Inventors:
WARREN C. RIES &
SEYMOUR LYNN
By Edward J. Norton
Attorney

United States Patent Office 3,449,650
Patented June 10, 1969

3,449,650
CAPACITOR ANODE HOLDER
Seymour Lynn, Cherry Hill, and Warren Calvin Ries, Moorestown, N.J., assignors to Radio Corporation of America, a corporation of Delaware
Filed Dec. 29, 1967, Ser. No. 694,682
Int. Cl. H01g 1/02, 13/00
U.S. Cl. 317—257                           6 Claims

ABSTRACT OF THE DISCLOSURE

A capacitor anode holder of two rings between which is sandwiched a dielectric. The dielectric is an epoxy resin uniformally coated on one of the rings. One of the rings has attached to it spring loaded metallic contacts which will receive the anode of a tube.

Background of the invention

This invention herein described was made in the course of or under the contract or subcontract thereunder with the Department of the Army.

This invention relates to an anode holder for mounting to the anode of an electronic tube and more particularly to an anode holder which also performs the function of providing direct current (D.C.) blocking and radio frequency current (R.F.) bypass for the output of the tube.

The anode holders of tubes which physically mount and hold the tubes to a chassis are often also used to block the D.C. voltage and couple the radio frequency current signal from the output of the tube. This is typically done by placing a strip of mica which acts as the dielectric for the capacitance between the inner and outer concentric metallic ring members which act as the plates of the capacitor. The strip of high quality mica is often hand wrapped around one of the metallic rings to the desirable thickness of the mica material to provide, in turn, the desirable amount of dielectric strength and capacitance. It is most likely in the above described arrangement that all air pockets between the layers of mica cannot be entirely eliminated by the present assembly technique and that the voltage gradient easily can exceed that which will rupture air. This is stated in a well known law in the field of dielectrics, "When a stronger insulation of higher permittivity (mica) is placed in series with a weaker insulation of lower permittivity (air), the larger voltage gradient will be across the weaker insulator"; hence, upon application of larger voltage, the air gap will break down and corona will occur. When corona starts, the air is decomposed into ozone and nitrogen. Ozone is a powerful oxidizing agent which attacks chemically most organic materials. Besides this chemical effect, corona discharges can erode organic materials such as glass and ceramics. High velocity ions and electrons cause the erosion. Local heating will take place and an arc may be initiated and sustained. Any mechanical stress previously created in an anode holder assembly such as an outer ring force fitted to aid in preventing the air gaps can greatly reduce the electrical strength of the mica which may eventually puncture. Further insight into the problem is discussed in a paper given by Carl G. Brodhun in the Physical Review, May 15, 1952, on page 653. It is, therefore, highly desirable to eliminate these air pockets and provide an improved anode holder which does not suffer from these corona effects.

It is an object of this invention to provide an improved anode holder by uniformly coating one of the metallic members of an anode holder with an epoxy resin having the desirable dielectric characteristics so as to act when fitted next to another metallic member as a high voltage capacitor and radio frequency signal bypass for the output of the tube placed in the holder.

Brief description of the invention

Briefly, this and other objects of this invention are provided by uniformly coating the outer concentric surface portion of a ring-shaped metallic member with an epoxy resin. The epoxy resin has a dielectric constant and dielectric strength sufficient to provide the necessary D.C. blocking capacitance and the R.F. bypass for the output of an electronic tube. The inner concentric surface of the ring-shaped metallic member is provided with spring-loaded metallic contacts adapted to receive and hold the anode of the tube placed within the aperture formed by the ring-shaped metallic member and the metallic contacts. An outer metallic member having a circular aperture is firmly fitted about the coated outer concentric surface of the ring-shaped metallic member to form an anode holder for supporting the tube and for forming a capacitance for allowing radio frequency current bypass for the output of the tube made up of the epoxy resin sandwiched between the ring-shaped metallic member and the outer metallic member.

Description of the preferred embodiment

The applicants' invention will be further described with reference to the following accompanying drawings:

FIGURE 1 is a top view of an anode holder in accordance with one embodiment of the present invention, and FIGURE 2 is a cross sectional view taken in the 2–2' plane of the anode holder of FIGURE 1.

FIGURES 1 and 2 illustrate an anode holder for bypassing alternating current signals out of the tube in accordance with one embodiment of the present invention. An inner metallic ring member 11 is adapted by means of a groove 15 within the inner concentric surface of inner ring member 11 to receive a ring of beryllium copper finger-like contacts 10. One portion 11a of ring 11 is made thicker than the other portion 11b to aid in holding the ring of contacts 10. The ring of contacts 10 may be inserted into the ring 11 by slitting the ring 10 all the way through at one portion of the ring so as to compress the ring and slide it into the inner ring member 11 at the narrower portion 11b and then by expanding the ring of contacts 10 so as to be lodged in the grooved portion 15. The finger-like contacts of ring 10 may be soldered directly to the inner concentric surface of inner ring 11 to provide a good electrical contact to the inner ring 11. The ends of these contacts 10 protrude into the aperture formed by the inner ring member 11 and the ring of contacts 10. The entire ring of contacts 10 may then be masked including the inner concentric surface of inner ring member 11 and an epoxy coating 20 placed about the unmasked portion of inner metallic ring member 11 with the masking being arranged so that only the portions of the ring member 11 in which the fingers of the contacts meet the inner ring member 11 remain uncoated. The process of coating may be varied but it is important that the thickness of the coating be uniform throughout the coated portion. The epoxy coating also should be of such thickness and the material of such dielectric constant and dielectric strength so as to provide the D.C. blocking of relatively high voltages (such as 800 volts D.C.) and R.F. bypassing (such as 100 volts RMS). The epoxy coating may be applied by heating the inner metallic ring member 11 to about 400° Fahrenheit and then by placing the member 11 in a tank containing powdered epoxy such as Cotvel ECA–1363 supplied by Polymer Corp., Reading, Pa. By a well known process powdered epoxy is placed in a fluid suspension and the inner metallic ring member is uniformly coated. The thin coat of epoxy resin may be approximately 8±2 mils thick. The dielectric constant of Cotvel ECA–1363 is from 5 to 6 (60 Hz. 77° F.) and the minimum dielectric strength is 800 volts per mil (10 mil coating). The application is hard yet flexible and may be processed with or without the contact spring fingers 10. The spring contact fingers 10 can be first masked during the dipping and curing operations at 400° Fahrenheit since the spring temper of beryllium copper which the contact fingers are usually made of would not be degraded. The capacitance developed with the epoxy dielectric is approximately 300 picofarads. The inner metallic ring member 11 which is coated with the dielectric 20 is then fitted tightly into a metallic holder 12 having an aperture therein. Holder 12 has holes 16 for mounting the anode holder and tube therein to the chassis. The holder 12 has a slit 17 therethrough and the inner ring 11 is force fitted within the aperture of the holder 12 to form a firmly united anode holder. A ring press 13 is press fitted about the holder 12 to further force fit the entire assembly into a firmly united anode holder. In operation, the anode of the tube is pressed through the aperture of the ring of contacts 10 and held by the spring loading of the beryllium copper contact fingers of ring 10. High voltage direct current (D.C.) at the tube is blocked by the capacitor made up of the dielectric sandwiched between the inner metallic ring 11 and the outer metallic holder 12. Radio frequency (R.F.) signal output is bypassed from the anode of the tube through the capacitor to holder 12.

What is claimed is:
1. An improved anode holder comprising:
  a ring-shaped metallic member having about the inner concentric surface of said ring-shaped member spring-loaded metallic contacts adapted to receive and hold the anode of a tube placed within the aperture formed by said ring-shaped metallic member and said contacts,
  a uniform coating of epoxy resin about the outer concentric surface of said ring-shaped metallic member, said epoxy resin having a dielectric constant and dielectric strength sufficient to provide a D.C. blocking capacitance and an R.F. bypass for the output of the tube,
  an outer metallic member firmly encircling said coated ring-shaped member so that said epoxy resin is sandwiched between said ring-shaped member and said outer member.
2. The anode holder as claimed in claim 1, wherein said ring-shaped metallic member includes a first inner ring of conductive fingers mounted within the inner concentric surface of a second metallic ring, and said uniform coating of epoxy resin is applied over the entire surface of said second metallic ring except where said ring of conductive fingers is mounted to said second metallic ring.
3. The anode holder as claimed in claim 1, wherein said epoxy resin is of a material which is hard yet flexible and has a high dielectric strength and low R.F. loss for a relatively thin conductive coating.
4. The method of making an anode holder for supporting an electronic tube and for providing R.F. bypass capacitance for the output of the tube comprising:
  providing a first metallic ring member,
  inserting a ring of finger-like metallic contacts adapted to receive and hold said tube within the inner concentric surface of said first metallic ring member,
  masking said inner concentric portion of said first ring member and said contacts,
  forming a uniform coating of epoxy resin on the unmasked surface of said first metallic ring member having a dielectric constant and dielectric strength sufficient to provide D.C. blocking and R.F. bypass for the output of a tube placed within the aperture formed by said ring of finger-like metallic contacts,
  removing said masking from said inner concentric portion of said first ring member and said contacts, and inserting said coated first metallic ring member within an outer metallic member having an aperture therein to form an anode holder and a capacitor made up of said resin sandwiched between said first metallic ring member and said outer metallic member.
5. The method as claimed in claim 4 wherein the forming of said coating includes the steps of:
  heating said first metallic ring member,
  placing said heated first metallic ring member in a tank of epoxy resin in fluid suspension, and removing said first metallic ring member from said tank when sufficient coating is attained.
6. A method for making an anode holder for supporting an electronic tube and for providing R.F. bypass capacitance for the output of the tube comprising:
  masking the inner concentric portion of a first metallic ring member having an inner and outer concentric surface,
  forming a uniform coating of epoxy resin on the unmasked surface of said first ring member having dielectric characteristic sufficient to provide high voltaged D.C. blocking and R.F. bypass for the output of the tube,
  removing said masking material from said inner concentric portion of said first metallic ring member,
  inserting a ring of finger-like metallic contacts adapted to receive and hold said tube within said inner concentric surface of said first metallic ring,
  inserting said coated first metallic ring member within an outer metallic member having an aperture therein to form an anode holder including therein a capacitor made up of said epoxy resin sandwiched between said first metallic ring and said outer metallic member.

References Cited
UNITED STATES PATENTS
2,875,386  2/1959  Fricke _____ 317—257

LEWIS H. MYERS, *Primary Examiner.*

E. A. GOLDBERG, *Assistant Examiner.*

U.S. Cl. X.R.
29—25.42